US010109859B1

(12) United States Patent
Goodenough et al.

(10) Patent No.: US 10,109,859 B1
(45) Date of Patent: Oct. 23, 2018

(54) ELECTROCHEMICAL CELLS WITH A HIGH VOLTAGE CATHODE

(71) Applicants: John B. Goodenough, Austin, TX (US); Maria Helena Sousa Soares De Oliveira Braga, Austin, TX (US)

(72) Inventors: John B. Goodenough, Austin, TX (US); Maria Helena Sousa Soares De Oliveira Braga, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 15/944,354

(22) Filed: Apr. 3, 2018

Related U.S. Application Data

(60) Provisional application No. 62/481,015, filed on Apr. 3, 2017.

(51) Int. Cl.
    *H01M 4/505*    (2010.01)
    *H01M 10/0562*  (2010.01)
    (Continued)

(52) U.S. Cl.
    CPC ............ *H01M 4/505* (2013.01); *H01G 11/28* (2013.01); *H01G 11/32* (2013.01); *H01G 11/48* (2013.01);
    (Continued)

(58) Field of Classification Search
    CPC ...... H01M 4/505; H01M 4/131; H01M 4/134; H01M 4/382; H01M 4/525; H01M 4/625;
    (Continued)

(56) References Cited

U.S. PATENT DOCUMENTS

| 6,066,417 A | 5/2000 | Cho et al. |
| 2006/0063051 A1 | 3/2006 | Jang |

(Continued)

FOREIGN PATENT DOCUMENTS

| CN | 104466239 | 3/2015 |
| WO | 2015/128834 | 9/2015 |

(Continued)

OTHER PUBLICATIONS

International Search Report and Written Opinion for PCT Patent Application No. PCT/US2018/025876, dated Jul. 4, 2018; 14 pages.

(Continued)

*Primary Examiner* — Helen Oi K Conley
(74) *Attorney, Agent, or Firm* — Baker Botts L.L.P.

(57) ABSTRACT

The present disclosure provides a rechargeable electrochemical cell including an electrolyte side, a cathode side, and a polymer/plasticizer. The electrolyte side includes a solid glass electrolyte including an electrolyte mobile cation and electric dipoles, as well as an anode including a metal of the electrolyte mobile cation and contacting the solid glass electrolyte at an anode:solid glass electrolyte interface. The cathode side includes a cathode including a cathode active material into which a cathode guest cation is reversibly extracted/inserted. The cathode active material has a voltage versus lithium (Li) metal of between 3V and 15V. The polymer/plasticizer contacts the solid glass electrolyte at a solid glass electrolyte:polymer/plasticizer interface and the cathode at a polymer/plasticizer:cathode interface such that the cathode guest cation is confined to the cathode side and the electrolyte mobile cation is confined to the anode side during charge and discharge of the electrochemical cell.

20 Claims, 7 Drawing Sheets
(7 of 7 Drawing Sheet(s) Filed in Color)

(51) Int. Cl.
  *H01M 4/131* (2010.01)
  *H01M 4/525* (2010.01)
  *H01M 4/134* (2010.01)
  *H01M 4/38* (2006.01)
  *H01M 4/62* (2006.01)
  *H01G 11/56* (2013.01)
  *H01G 11/50* (2013.01)
  *H01G 11/48* (2013.01)
  *H01G 11/28* (2013.01)
  *H01G 11/32* (2013.01)
  *H01M 10/0525* (2010.01)

(52) U.S. Cl.
  CPC ............ *H01G 11/50* (2013.01); *H01G 11/56* (2013.01); *H01M 4/131* (2013.01); *H01M 4/134* (2013.01); *H01M 4/382* (2013.01); *H01M 4/525* (2013.01); *H01M 4/625* (2013.01); *H01M 10/0525* (2013.01); *H01M 10/0562* (2013.01); *H01M 2300/0037* (2013.01); *H01M 2300/0071* (2013.01)

(58) Field of Classification Search
  CPC ............ H01M 10/0525; H01M 10/562; H01G 11/28; H01G 11/56
  See application file for complete search history.

(56) References Cited

U.S. PATENT DOCUMENTS

| | | |
|---|---|---|
| 2015/0017547 A1 | 1/2015 | Hsieh et al. |
| 2016/0190640 A1 | 6/2016 | Visco et al. |

FOREIGN PATENT DOCUMENTS

| | | |
|---|---|---|
| WO | 2016/205064 | 12/2016 |
| WO | 2018/013485 | 1/2018 |

OTHER PUBLICATIONS

Braga, M. H., et al. "Alternative strategy for a safe rechargeable battery." *Energy & Environmental Science* vol. 10, No. 10 (Dec. 9, 2016): 331-336; 6 pages.

ELECTROCHEMICAL CELLS WITH A HIGH VOLTAGE CATHODE

PRIORITY CLAIM

The present application claims priority under 35 U.S.C. § 119(e) to U.S. Provisional Patent Application Ser. No. 62/481,015, filed Apr. 3, 2017, titled "Electrochemical Cells with A High Voltage Cathode," which is incorporated by reference herein in its entirety.

TECHNICAL FIELD

The present disclosure relates to rechargeable electrochemical cells in which the electrolyte includes two dielectric electronic insulators in series and in which the cathode may be a high voltage cathode. The disclosure further relates to devices, such as rechargeable batteries and supercapacitors, that use these electrochemical cells.

BACKGROUND

An electrochemical cell has two electrodes, the anode and the cathode, separated by an electrolyte. An electrochemical cell can have a variety of functions, including as a battery cell, a capacitor cell, or a fuel cell. The electrochemical cell typically has two electrodes, an anode and a cathode, which are good electronic conductors and which store electric power as chemical energy in a battery cell and as surface electrostatic energy in a capacitor cell. Catalytic electrodes convert the chemical energy of a fuel to electric power in a fuel cell. The electrochemical cell also contains an electrolyte, which is located in series between the anode and the cathode.

Reaction between the two electrodes during charge or discharge of the electrochemical cell involves transfer of a positive charge between the two electrodes inside the electrochemical cell via the electrolyte. Negative charge is transferred during charge or discharge as electronic current in an external circuit. The electrolyte is an electronic insulator, so the negative charge is forced to be transferred via the external circuit; it cannot be transferred internally via the electrolyte.

In a traditional rechargeable electrochemical battery cell, both electrodes are sources and sinks of mobile cations (often referred to as the working ions) of the electrolyte. During charge one electrode acts as the source of the working ions and the other acts as a sink; these functions are reversed during discharge.

In a traditional electrochemical capacitor cell, electrostatic power is stored as electric power in two electric-double-layer-capacitors at the two electrode:electrolyte interfaces.

SUMMARY

The present disclosure provides a rechargeable electrochemical cell including an electrolyte side, a cathode side, and a polymer/plasticizer. The electrolyte side includes a solid glass electrolyte including an electrolyte mobile cation and electric dipoles, as well as an anode including a metal of the electrolyte mobile cation and contacting the solid glass electrolyte at an anode:solid glass electrolyte interface. The cathode side includes a cathode including a cathode active material into which a cathode guest cation is reversibly extracted/inserted. The cathode active material has a voltage versus lithium (Li) metal of between 3V and 15V. The polymer/plasticizer contacts the solid glass electrolyte at a solid glass electrolyte:polymer/plasticizer interface and the cathode at a polymer/plasticizer:cathode interface such that the cathode guest cation is confined to the cathode side and the electrolyte mobile cation is confined to the anode side during charge and discharge of the electrochemical cell.

The above electrochemical cell may also have any of the following additional features, which may be combined with one another in any and all possible combinations unless clearly mutually exclusive:

i-i) the electrolyte mobile cation and the cathode guest cation may be the same type of cation;

i-ii) the electrolyte mobile cation and the cathode guest cation may be different types of cations;

ii) the polymer/plasticizer may include a mobile cation;

ii-a) the mobile cation in the polymer/plasticizer may be the same type of cation as the electrolyte mobile cation, the cathode guest cation, or both;

ii-b) the mobile cation in the polymer/plasticizer may be a different type of cation than the electrolyte mobile cation, the cathode guest cation, or both;

ii-c) the polymer/polymer plasticizer may include a polymer or plasticizer and the molar ratio of polymer or plasticizer to mobile cation may be between 10:1 and 50:1;

ii-d) the mobile cation may be supplied by $LiClO_4$ in the polymer/plasticizer;

iii) the polymer/plasticizer may include a material having a dielectric constant between 50 and 24,000;

iv) the polymer/plasticizer may include a —C≡N terminal group;

iv-a) the polymer/plasticizer may include succinonitrile;

v) the polymer/plasticizer may include electric dipoles;

vi) the electrochemical cell may include a cathode current collector contacting the cathode at a cathode:cathode current collector interface;

vi-a) the electrolyte mobile cation, the cathode guest cation, or both may move in the direction of the anode or the cathode current collector on average no more than $1/10,000^{th}$ of the distance between the anode:sold glass electrolyte interface and the cathode:cathode current collector interface during a charge/discharge cycle of the electrochemical cell;

vii) the metal in the anode may include Li metal, sodium (Na) metal, potassium (K) metal, aluminum metal (Al), magnesium (Mg) metal, or alloys thereof;

viii) the electrolyte mobile cation may include lithium ion ($Li^+$), sodium ion ($Na^+$), potassium ion ($K^+$), aluminum ion ($Al^{3+}$), or magnesium ion ($Mg^{2+}$);

ix) the cathode active material may include a layered oxide, a spinel, or an olivine;

x) the cathode guest cation may include lithium ion ($Li^+$), sodium ion ($Na^+$), potassium ion ($K^+$), aluminum ion ($Al^{3+}$), or magnesium ion ($Mg^{2+}$);

xi) the cathode may include elemental carbon (C);

xii) the electric dipoles of the solid glass electrolyte may include material of the general formulas $A_2X$ or $AX^-$, or $MgX$ or $Al_2X_3$ where A is Li, Na, or K and X is oxygen (O), sulfur (S) or combinations thereof;

xiii) the solid glass electrolyte may include a dipole additive;

xiv) the solid glass electrolyte may have a relative permittivity ($\newline\in_r$) of between $10^2$ and $10^5$;

xv) the solid glass electrolyte may have an ionic conductivity ($\sigma_i$) of between $10^{-2}$ S/cm and $10^{-3}$ S/cm at 25° C.;

xvi) the rechargeable electrochemical cell may have a specific capacity at 25° C. of between 2500 mAh/g of cathode active material and 5000 mAh/g of cathode active material;

xvii) the rechargeable electrochemical cell may have a specific capacity that continuously increases between 1 and 20,000 charge/discharge cycles.

The disclosure also provides a battery including at least one electrochemical cell as described above or at least two electrochemical cells as described above. These batteries may be for use in powering an all-electric or hybrid vehicle, for use in powering a hand-held tool or electronic device, for use in powering a boat or submarine, for use in powering a drone, or airplane, or other flying toy or vehicle, for use in storing electric power in a stationary store for homes, businesses, hospitals, and/or grid, or for use in storing electric power generated by solar radiation, wind, waves, hydropower, and/or nuclear energy.

The above electrochemical cells and batteries may also be combined with any other features described in this Specification or Figures and such features may be combined with one another unless clearly mutually exclusive.

BRIEF DESCRIPTION OF THE DRAWINGS

For a more complete understanding of the present disclosure and its features and advantages, reference is now made to the following description, taken in conjunction with the accompanying drawings which illustrate examples of the disclosure, and which may be combined with one another and with all other written and illustrated portions of this disclosure, unless clearly mutually exclusive.

The patent or application file contains at least one drawing executed in color. Copies of this patent or patent application publication with color drawing(s) will be provided by the Office upon request and payment of the necessary fee.

DETAILED DESCRIPTION

The present disclosure relates to electrochemical cells, such as rechargeable battery cells or supercapacitor cells, that store electric power both as chemical energy and as electrostatic energy via a configuration that includes two dielectric insulators, a solid glass electrolyte and a polymer/plasticizer. These electrochemical cells deliver electric power during discharge as electronic current at a voltage, V, for a time period. The time period for which the electrochemical cell delivers electric power depends on the amount of stored electric power and the rate of discharge.

Electrochemical cells as disclosed herein may be rechargeable, safe, low-cost, and have a high energy density with a long cycle life and low internal resistance.

Figure 1:
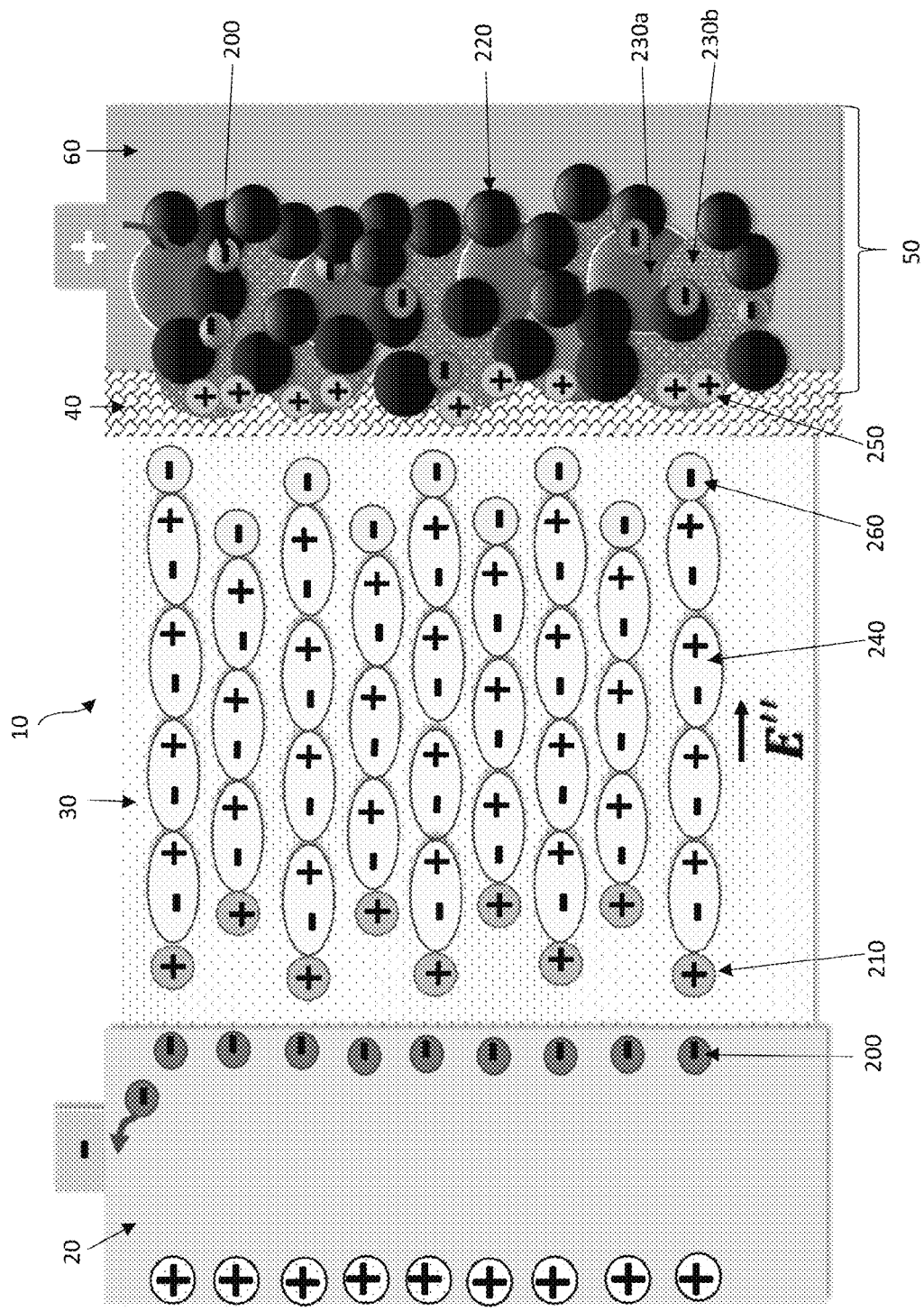
FIG. 1 is a schematic, cross-sectional diagram of an electrochemical cell of the present disclosure while being discharged.
Figure 2:
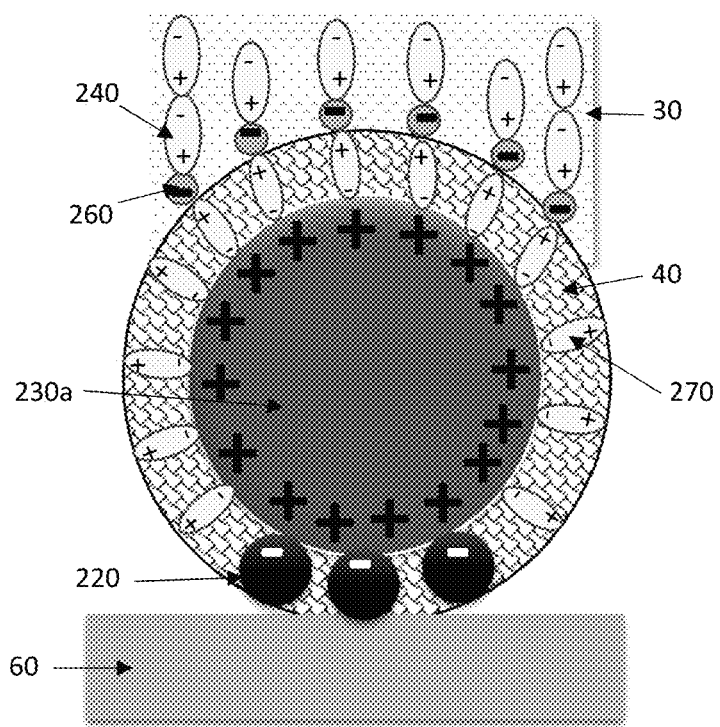
FIG. 2 is a schematic, cross-sectional diagram of the sold glass electrolyte, polymer/plasticizer, cathode active material particle, carbon particles, and current collector of an electrochemical cell of the present disclosure while being discharged.
Figure 3:
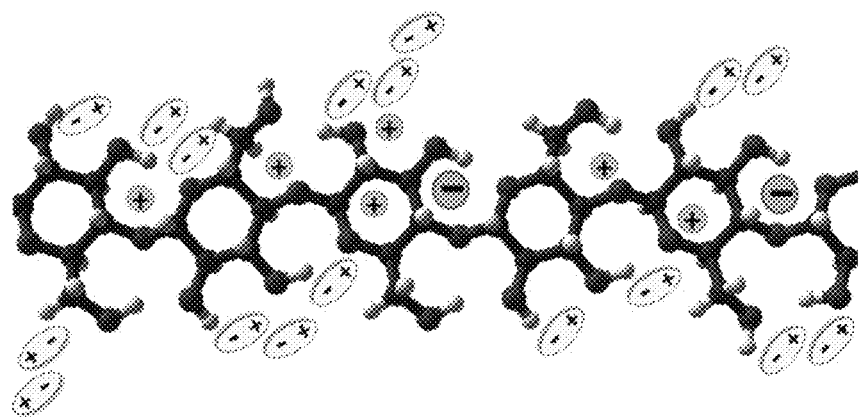
FIG. 3 is a schematic diagram of a solid glass electrolyte including cellulose.

The present disclosure relates to an electrochemical cell including two dielectric components, a solid glass electrolyte and a polymer/plasticizer, such as is illustrated in FIGS. 1-3.

Referring now to FIG. 1 and FIG. 2, an electrochemical cell 10 may include an anode 20, which may include a metal, such as Li metal, Na metal, K metal, aluminum (Al) metal, magnesium (Mg) metal, or alloys thereof. The metal may in particular be an alkali metal, such as lithium (Li), sodium (Na), or potassium (K), or alloys thereof. The metal in the anode 20 is present as an electrolyte mobile cation 210 in a solid glass electrolyte 30. The anode 20 may also include a current collector material, such as carbon, Al metal, or Mg metal (not shown. The metal in the anode 20 includes at least one metal that is electrochemically active in electrochemical cell 10 and the anode 20 may include more than one metal that is electrochemically active in electrochemical cell 10 if a more complex electrochemical profile, such as the ability to operate at different voltages, is provided. The metal may be in the form of a thin sheet, such as a foil.

The anode 20 may be adjacent to and form an interface with an anode current collector (not shown) on one side and adjacent to and form an interface with the solid glass electrolyte 30 on the other. The anode current collector may also be a metal, such as stainless steel (SS) or copper (Cu) and, in particular, may be a casing, such as casing 110 shown in FIG. 4. The anode 20 is in electronic contact with the anode current collector, if present. In some electrochemical cells 10, the anode 20 may be used without an anode current collector, for example particularly if the anode 20 includes Al.

The electrochemical cell 10 also includes a cathode 50. The cathode 50 may include any cathode active material 230 that has a host framework into/from which a mobile cathode guest cation 250 can be extracted/inserted reversibly. Suitable cathode guest cations 250 include alkali metal cations, such as Li$^+$-ion, Na$^+$-ion, and K$^+$-ion, other metal cations, such as Al$^+$-ion and Mg$^+$-ion, or larger cations formed from two or more atoms.

The cathode 50 may be a high-voltage cathode, in that it produces a high voltage current upon discharge of the electrochemical cell. For example, the high voltage cathode may have a cathode active material with a voltage v. Li metal of at least 3V, at least 4V, at least 5V, between 3V and 15V, 3V and 10V, between 3V and 8V, between 4V and 15 V, between 4V and 10 V, between 4V and 8V, between 5V and 15V, between 5V and 10V, or between 5V and 8V. The electrochemical cell may have discharge voltages in any of the above ranges. The high voltage may also be produced at a high current. The cathode active material 230 may be a crystalline metal oxide that accepts Li$^+$ ions or another cathode guest cation 250. For example, it may be a layered oxide, such as a metal oxide having the general formula AMO$_2$, where A is the cathode guest cation and M is a metal or combination of metals and in particular may include at least one transition metal, having a crystal structure like that of lithium cobalt oxide. The cathode active material 230 may be a spinel, such as a metal oxide having the general formula AM$_2$O$_4$, where A is the cathode guest cation and M is a metal or combination of metals and in particular may include at least one transition metal, having a crystal structures like that of lithium manganese oxide. The cathode active material 230 may be an olivine, such as metal phosphate, silicate, sulfate, or vanadate, having the general formula AMXO$_4$, where A is the cathode guest cation, M is a metal or combination of metals and in particular may include at least one transition metal, and X is phosphorus, silicon, sulfur, or vanadium. The above general formulas for the cathode active material 230 may contain varying amounts of metal or other components such that they overall compound has charge neutrality when the cathode guest cation 250 is fully inserted. The cathode active material 230 may also be any other host compound that allows reversible insertion/extraction of the cathode guest cation 250. In the example illustrated in FIG. 1 and FIG. 2, the cathode active material 230 allows reversible extraction/insertion of Li$^+$ ions, and exists in a lithiated state (230*a*) and a delithiated state (230*b*), both of which may be present in the cathode 50 at the same time. The cathode active material 230 may be in the form of particles, as illustrated. The cathode 50 may also include elemental carbon (C) 220, for example in the form of particles as illustrated. The elemental carbon may be in the form of carbon black, carbon nanoparticles, carbon fibers, graphite, or other forms of carbon. The cathode 50 further includes a cathode current collector 60. The cathode current collector may include any metal, such as aluminum (Al).

The polymer/plasticizer 40 may contact the solid glass electrolyte 30 at one interface and the cathode 50 at the other interface. The polymer/plasticizer 40 may be a sheet between the solid glass electrolyte 30 and the cathode 50, it may coat the cathode 50, or it may be in any other form suitable to confine the cathode guest cation 250 to the vicinity of the cathode 50, such that the polymer/plasticizer 40 prevents the cathode guest cation 250 from being supplied to the anode 20 or the solid glass electrolyte 30 from the cathode 50 during cycling of the electrochemical cell 10.

The solid glass electrolyte 30 is referred to as a glass because it is amorphous, as may be confirmed through the absence of peaks characteristic of crystalline material in X-ray diffraction.

In particular, the solid glass electrolyte 30 of this disclosure may be a glass containing a mobile metal cation, such as an alkali metal cation, Li$^+$, sodium ion (Na$^+$), potassium ion (K$^+$), or another metal cation such as aluminum ion (Al$^{3+}$) or magnesium ion (Mg$^{2+}$). This metal cation is referred to as the electrolyte mobile cation 210 and may be a cation of the electrochemically active metal in the anode 20 so that the electrolyte mobile cation can plate onto the anode 20 and the electrochemically active metal in the anode 20 can form the electrolyte mobile cation 210. The solid glass electrolyte 30 also contains electric dipoles 240 such as A$_2$X or AX$^-$, or MgX or Al$_2$X$_3$ where A=Li, Na, or K and X=oxygen (O) or sulfur (S) or combinations thereof, or another element or electric dipole molecule. Suitable solid glass electrolytes and methods of making them have been previously described in WO2015 128834 (A Solid Electrolyte Glass for Lithium or Sodium Ion Conduction) in WO2016205064 (Water-Solvated Glass/Amorphous Solid Ionic Conductors), and in WO2018013485 (Self-Charging and/or Self-Cycling Electrochemical Cells) where the solid glass electrolyte composition, methods of making, and methods of incorporating into electrochemical cell disclosures of both are incorporated by references herein.

The solid glass electrolyte 30 contains a dipole additive of the general formula $Q_yX_z$ or $Q_{y-1}X_z^{-q}$, or polarized chains that are combinations of coalescent dipoles represented by both general formulas, wherein Q is an alkali metal, such as Li, Na, and K, Mg, or Al, or combination thereof, X is an anion or anion-forming element or compound, including S, O, silicon (Si), or hydroxide (OH$^-$) or a combination thereof, $0<z\leq3$ (more specifically, z is 1, z is 2, and/or z is 3), y is sufficient to ensure charge neutrality of dipoles of the general formula $A_yX_z$, or a charge of –q of dipoles of the general formula $A_{y-1}X_z^{-q}$ (more specifically, $0<y\leq3$, or y is 1, y is 2, or y is 3, or combinations thereof), and $1\leq q\leq3$ (more specifically, q is 1, q is 2, or q is 3, or combinations thereof).

Mixtures of dipole additives with the general formulas $Q_yX_z$ or $Q_{y-1}X_z^{-q}$ may be particularly likely to be present after the initial charge or initial cycle of the electrochemical cell 10 because the additives may lose one or more metal cations, while still retaining at least one metal cation bound to the anion and thus still retaining its dipole nature.

Specific dipole additives may have the formula Q$_2$S or QS$^-$, or a combination of additives represented by both general formulas, wherein Q is Li, Na, and/or K, such as Li$_2$S or a mixture of Li$_2$S and LiS$^-$.

Other specific dipole additives may have the formula Q$_2$O or QO$^-$, or a combination of additives represented by both general formulas, wherein Q is Li, Na, and/or K, such as Li$_2$O or a mixture of Li$_2$O and LiO$^-$.

Other specific dipole additives may be ferroelectric condensate molecules of the above dipoles in which Q is Li, Na, or K and X is O, S, or a combination thereof.

Still other specific dipole additives may be polymeric larger dipole molecules or compositions, such as a paper or other cellulose with negative groups, such as hydroxyl groups, or polytetrafluoroethylene (PTFE). FIG. 3 illustrates a solid glass electrolyte 30 containing cellulose.

Other additives may increase the dielectric constant of the solid glass electrolyte 30. For example, other additives may include be crystalline materials with high dielectric constants, particularly a dielectric constant such as at least 5000, at least 7000, or between 5000 and 10,000, between 7000 and 10,000, between 5000 and 15,000, or between 7000 and 15,000. Suitable crystalline materials include BaTiO$_3$, SrTiO$_3$, CaCu$_3$Ti$_4$O$_{12}$, SiO$_2$ and/or TiO$_2$.

The presence of the electric dipoles gives the solid glass electrolyte 30 a high dielectric constant, such as at least 5000, at least 7000, or between 5000 and 10,000, between 7000 and 10,000, between 5000 and 15,000, or between 7000 and 15,000

In addition, the solid glass electrolyte 30 is not reduced on contact with the electrochemically active metal in the anode 20. Therefore, there is no formation of a passivating solid-electrolyte interphase (SEI) at the interface of solid glass electrolyte 30 with the anode 20.

The surface of the solid glass electrolyte 30 is wet by the electrochemically active metal, such as the alkali metal, of the anode 20, which allows dendrite-free plating of the metal to the anode 20 from the electrolyte mobile cations 210 of the solid glass electrolyte 30. This provides a low resistance to the transfer of metal cations across the anode:solid glass electrolyte interface over at least 1000 cycles, at least 2000 cycles, at least 5000 cycles, between 200 and 300 cycles, between 200 and 1000 cycles, between 200 and 5000 cycles, between 200 and 10,000 cycles, between 200 and 15,000 cycles, between 200 and 20,000 cycles, between 1000 and 5000 cycles, between 1000 and 10,000 cycles, between 1000 and 15,000 cycles, or between 1000 and 20,000 cycles.

The solid glass electrolyte 30 may have a large dielectric constant, such as a relative permittivity ($\in_r$) of at least $10^2$, between $10^2$ and $10^3$, between $10^2$ and $10^4$, or between $10^2$ and $10^5$. The solid glass electrolyte 20 may have an ionic conductivity ($\sigma_i$) for the electrolyte mobile cation 210 of at least $10^{-2}$ S/cm at 25° C., or between $10^{-2}$ S/cm and $10^{-3}$ S/cm at 25° C. This conductivity is comparable to the ionic conductivity of the flammable conventional organic-liquid electrolytes used in Li-ion batteries. The resistance to cation transport in a solid electrolyte is Thickness/[$\sigma_i \times$Area], where $\sigma_i$ is the cation conductivity of the electrolyte and Thickness/Area is the ratio of the electrolyte thickness to its area. Typically, the solid glass electrolyte 30 will have a Thickness/Area that is less than 1, less than 0.5, less than 0.25, less than 0.1, less than 0.05, between 0.01 and 0.05, between 0.01 and 0.1, between 0.1 and 0.25, between 0.01 and 0.5, between 0.01 and 1, between 0.05 and 0.1, between 0.05 and 0.25, between 0.05 and 0.5, between 0.05 and 1, between 0.1 and 0.25, between 0.1 and 0.5, or between 01 and 1. The $\sigma_i$ of electrochemical cell 10 can be determined from the Thickness/Area, when the resistance is measured, for example by making and electrical impedance spectroscopy measurement or a charge/discharge measurement using a symmetric cell with two electrodes of the alkali metal working ion.

The solid glass electrolyte 30 is electronically insulating due to a sufficiently large energy-state gap and may be non-flammable.

The solid glass electrolyte 30 may be formed by transforming a crystalline electronic insulator containing the electrolyte mobile cation 210 or its constituent precursors (typically containing the working ion bonded to O, OH$^-$, and/or a halide) into a cation-conducting glass/amorphous solid. This process can take place in the presence of a dipole additive as well.

The solid glass electrolyte 23 may be in the form of a membrane, which is typically mechanically robust.

Each component of the electrochemical cell 10 may have thickness measured in the direction perpendicular to the surface area. The thickness of each component may vary by less than 25%, less than 10%, less than 5%, less than 1%, or less than 0.5%, between 0.01% and 0.5%, between 0.01% and 1%, between 0.01% and 5%, between 0.01% and 10%, between 0.01% and 25%, between 0.5% and 1%, between 0.05% and 5%, between 0.5% and 1%, between 0.5% and 5%, between 0.5% and 10%, between 0.5% and 25%, between 1% and 5%, between 1% and 10%, between 1% and 25%, between 5% and 10%, between 5% and 25%, or between 10% and 25%. The solid glass electrolyte may have a thickness of at least 10 μm, at least 25 μm, at least 50 μm, at least 75 μm, at least 100 μm, between 10 μm and 100 μm, between 25 μm and 100 μm, between 50 μm and 100 μm, between 75 μm and 100 μm, between 10 μm and 2000 μm, between 25 μm and 2000 μm, between 50 μm and 2000 μm, between 75 μm and 2000 μm, between 100 μm and 2000 μm, between 10 μm and 5000 μm, between 25 μm and 5000 μm, between 50 μm and 5000 μm, between 75 μm and 5000 μm, or between 100 μm and 5000 μm.

The polymer/plasticizer 40 may be any dielectric material formed from a polymer, plasticizer, or combination thereof, that is able to confine the cathode guest cation 250 to the vicinity of the cathode 50, such that it is not supplied to the anode 20 or the solid glass electrolyte 30 from the cathode 50 during cycling of the electrochemical cell 10. In particular, the polymer/plasticizer 40 may also be a material that is not oxidized when in contact with the cathode active material 230 during cycling of the electrochemical cell 10. The polymer/plasticizer 40 may have a dielectric constant of at least 50, between 50 and 5000, between 50 and 10,000, between 50 and 15,000, between 50 and 20,000, or between 50 and 24,000.

The polymer/plasticizer 40 may contain mobile cations such as those of a salt that are different from the cathode guest cation 230 and that are confined to the polymer/plasticizer. For example, the polymer/plasticizer 40 may contain lithium perchlorate (LiClO$_4$). The polymer/plasticizer 40 may accept cations from the cathode 50 without transfer of the cathode guest cation 230 to the anode 20 or the solid glass electrolyte 30. If the polymer/plasticizer includes a mobile cation, the molar ratio of polymer or plasticizer to mobile cation may be between 10:1 and 50:1, between 10:1 and 40:1, between 10:1 and 30:1, between 10:1 and 20:1, between 10:1 and 15:1, between 15:1 and 50:1, between 15:1 and 40:1, between 15:1 and 30:1, between 15:1 and 20:1, between 20:1 and 50:1, between 20:1 and 40:1, between 20:1 and 30:1, between 15:1 and 25:1, between 18:1 and 22:1, or 20:1.

In a specific example, the polymer/plasticizer 40 may contain a polymer or plasticizer containing a —C≡N terminal group, including and similar to those in N≡C—CH$_2$—CH$_2$—C≡N.

The polymer/plasticizer 40 may contain electric dipoles 270, which may be bonded by dipole-dipole interactions, free to rotate, or both.

The surface area of the polymer/plasticizer 40 may be the same or larger than the surface area of the cathode 50 so that the polymer/plasticizer 40 may separate the electrolyte side of the electrochemical cell 10 from the cathode side of the electrochemical cell 10. The surface areas of one, more than one, of the other components of the electrochemical cell 10, including the anode current collector, if present, the anode 20, the cathode 50, and the cathode current collector 60 may be equal to or smaller than the surface area of polymer/plasticizer 40. The electrochemical cell 10 may be in a casing or may contain other components in order to seal the electrochemical cell 10 and to allow the polymer/plasticizer 40 to separate the electrolyte side of the electrochemical cell 10 from the cathode side of the electrochemical cell.

The ability of the polymer/plasticizer 40 to block transfer of cations, along with a configuration where it physically separate the electrolyte side of the electrochemical cell 10 from the cathode side, allows the electrolyte mobile cation 210 to be different from the cathode guest cation 250.

During cycling of a traditional electrochemical cell, the cathode swells on discharge and shrinks on charge. This is particularly true where the cathode is in the form of particles of a cathode active material. This often results in failure of traditional electrochemical cells as the cathode active materials loose contact with other components, such as a solid electrolyte. Liquid electrolytes are typically used in traditional electrochemical cells to accommodate volume changes in a cathode active material, but liquid electrolytes do not permit the highest voltages obtainable with many such cathodes, so polymer/plasticizer 40 in contact with the cathode 50 is used in electrochemical cell 10 of this disclosure to ensure a safe, high-voltage solid-state battery with a long cycle life. In electrochemical cell 10, these three-dimensional (3D) volume changes of the cathode active material 230 are accommodated by the polymer/plasticizer 40, which maintains contact with the cathode 50 at their interface during electrochemical cell cycling.

In particular, the high-voltage cathodes of electrochemical cells disclosed herein may retain their cathode active material 230 particle structure, or other cathode active material 230 physical structure with, at most, only distortion changes on cycling cathode guest cations 250 in and out over a large solid-solution range. The cathode active material 230 volume changes during cycling are accommodated over a long cycle life because the cathode 50 is in contact with a soft or plastic material, the polymer/plasticizer 40.

In the illustration of FIG. 1, the cathode active material 230 is in the form of particles that contact the polymer/plasticizer 40 on one side and the cathode current collector 60 on the other side. In the illustration of FIG. 2, the cathode active material 230 is in the form of particles that contact the cathode current collector 60 through carbon 200 particles. Other cathode configurations using a thicker cathode, in which individual cathode active material particles 230 contact only one or neither of the polymer/plasticizer 40 or cathode current collector 60, are also possible.

The internal resistance of the electrochemical cell 10 may be minimized or reduced to provide a high rate of charge/discharge at room temperature. The impedance to cation transfer between the electrodes could be a problem because of low cation conductivity in a traditional electrolyte. The present disclosure solves this problem by restricting the electrolyte mobile cation 210 and the cathode guest cation 250 to small displacements. In particular, electrolyte mobile cation 210, cathode guest cation 250, or both may move in the direction of the anode or the cathode current collector, on average, no more than $1/10,000^{th}$, $1/1000^{th}$, no more than $1/100^{th}$, no more than $1/50^{th}$, between $1/50^{th}$ and $1/10,000^{th}$, between $1/50^{th}$ and $1/1000^{th}$, between $1/50^{th}$ and $1/100^{th}$, between $1/100^{th}$ and $1/10,000^{th}$, between $1/100^{th}$ and $1/1000^{th}$, or between $1/1000^{th}$ and $1/10,000^{th}$ of the distance between the anode:solid glass electrolyte interface and the cathode:cathode current collector interface during a charge/discharge cycle.

As shown in FIG. 1 and FIG. 2, electric double-layer capacitors may form at the interface of the solid glass electrolyte 30 and the anode 20, at the interface of the solid glass electrolyte 30 and the polymer/plasticizer 40, and at the interface of the polymer/plasticizer 40 and the cathode 50. The additional interface of the polymer/plasticizer 40 and the solid glass electrolyte 30, as compared to electrochemical cells lacking a polymer/plasticizer, provides additional electrostatic storage of electric power through the formation of an additional double layer capacitor.

During discharge of an electrochemical cell 10 that has been charged from a discharged state, positive charge is transported inside the electrochemical cell by stripping electrolyte mobile cations 210 from the anode 20 back to the solid glass electrolyte 30, by small displacements of electrolyte mobile cations 210 and electric dipoles 240 in the electrolyte, including reorientation of the electric dipoles 240, by movement or other contribution of polymer/plasticizer 40 mobile cations at the polymer/plasticizer:cathode interface, and by insertion of cathode guest cations 250 extracted during charge with the cathode active material 230b. The negative charge is transported by electrons 200 as electric current in the external circuit (not shown), as in a traditional electrochemical cell. Discharge includes the discharge of electrostatic energy stored in the capacitor formed at the polymer/plasticizer:solid glass electrolyte interface. The discharge of this capacitor is slower than the discharge of a traditional capacitor because the polymer/plasticizer:solid glass electrolyte interface capacitor has no electronic component.

In general, electrochemical cell 10 containing solid glass electrolyte 30 operates by transporting electronic charge between the electrodes (anode 20 and cathode 50) using an external circuit (not shown). Mobile cation (210 and 250) displacements transport ionic charge between the electrodes largely by small displacements at the electrode interfaces, where plating and stripping occur at the anode. When these small displacements occur, a small electric dipole 240 displacement occurs within the solid glass electrolyte 30 due to the presence of both electrolyte mobile cations 210 and slower-moving electric dipoles 240 in the solid glass electrolyte 30. These electric dipole displacements largely substitute for cation transport across the solid glass electrolyte 30, unlike what typically occurs in liquid electrolytes. This allows very fast charge and discharge of the electrochemical cell 10, as well as long cycle-life.

FIG. 1 provides details of the discharge process. In particular, FIG. 1 shows an electric double-layer capacitor at the anode:sold glass electrolyte interface, another electric double-layer capacitor at the solid glass electrolyte:polymer/plasticizer interface, and still another electric double-layer capacitor at the polymer/plasticizer:cathode interface. At the anode side of the electrochemical cell 10, the anode 20 returns the electrolyte mobile cations 210 stripped from the solid glass electrolyte 30 during charge, but the electric double-layer capacitor at the anode:sold glass electrolyte interface remains as in the uncycled electrochemical cell at open-circuit to equilibrate the chemical potentials of the two electrodes.

Electrochemical cell 10 may have an specific capacity at 25° C. of at least 2500 mAh/g of cathode active material, at least 2750 mAh/g of cathode active material, or at least 3000 mAh/g of cathode active material, between 2500 mAh/g of cathode active material and 3000 mAh/g of cathode active material, between 2500 mAh/g of cathode active material and 4000 mAh/g of cathode active material, between 2500 mAh/g of cathode active material and 5000 mAh/g of cathode active material, between 2750 mAh/g of cathode active material and 3000 mAh/g of cathode active material, between 2750 mAh/g of cathode active material and 4000 mAh/g of cathode active material, between 2750 mAh/g of cathode active material and 5000 mAh/g of cathode active material, between 3000 mAh/g of cathode active material and 4000 mAh/g of cathode active material, or between 3000 mAh/g of cathode active material and 5000 mAh/g of cathode active material.

Electrochemical cell to may have a specific capacity that continuously increases between 1 and 300, 1 and 500, 1 and 1,000, 1 and 5,000, 1 and 10,000, or 1 and 20,000 charge/discharge cycles.

Figure 4:
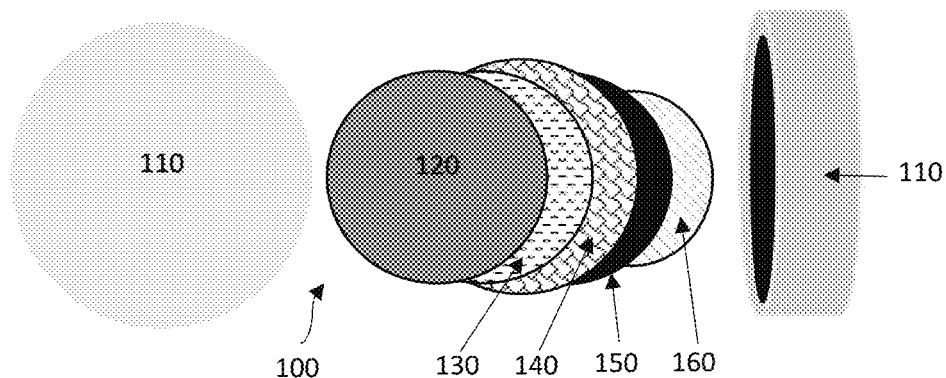
FIG. 4 is a schematic, exploded diagram of a coin cell including a solid glass electrolyte of the present disclosure.

FIG. 4 is a schematic diagram of an example coin cell 100 including an electrochemical cell 10 of the present disclosure. The coin cell 100 includes a casing 110, which may be stainless steel or another electronically conductive material or an electronically insulating material with electronically conductive contacts. The casing 110 may serve as an anode current collector. The coin cell 100 also includes an anode sheet 120, which may include an anode 20 and, optionally, an anode current collector. The coin cell 100 includes a solid glass electrolyte sheet 130, which may include a solid glass electrolyte 30. The solid glass electrolyte sheet 130 may include the solid glass electrolyte 20 in a paper matrix as shown in FIG. 3 for ease of assembly. The coin cell 100 further includes a polymer/plasticizer sheet 140, which includes a polymer/plasticizer 40. As shown, the polymer/plasticizer sheet 40 may have a larger surface area than the solid glass electrolyte sheet 130. The coin cell 100 additionally includes a cathode sheet 150, which includes the cathode 50 and which may also include a cathode current collector 60. Finally, the coin cell 100 includes a spring 160 to help maintain the interface of the sheets. The coin cell 100 may contain multiple iterations of sheets 120, 130, 140 and 150, with an electronically insulative separator between then (not shown). One of ordinary skill in the art will appreciate that coin cells are frequently constructed as test cells and that other batteries may be constructed using methods known in the art to adapt finding in coin cells to other types of batteries.

Electrochemical cells of the present disclosure, including those described generally, illustrated in FIG. 1, FIG. 2, and FIG. 4, or described in the Examples, may be used in batteries, including both single-cell and multi-cell batteries. Such battery cells may contain components other than an electrochemical cell, such as and a casing or other simple mechanical features. Multi-cell batteries often contain multiple similar battery cells. Battery cells may be fabricated in standard formats, such as coin cells (including that of FIG. 4), pouch cells, jellyroll cells, or prismatic cells. They may also be in more tailored formats, such as tailored prismatic cells with non-uniform geometries.

Electrochemical cells of the present disclosure may also be used in more complex batteries, such as batteries containing complex circuitry and a processor and memory computer-implemented monitoring and regulation.

Regardless of simplicity, complexity, or format, all batteries using electrochemical cells of the present disclosure may exhibit improved safety, particularly a lower tendency to catch fire when damaged or charged rapidly, as compared to batteries with liquid electrolytes.

In addition, batteries according to the present disclosure may be multi-cell batteries, containing at least 10, at least 100, at least 500, between 10 and 10,000, between 100 and 10,000, between 1,000 and 10,000, between 10 and 1000, between 100 and 1,000, or between 500 and 1,000 electrochemical cells of the present disclosure. Cells in multi-cell batteries may be arranged in parallel or in series.

Batteries containing electrochemical cells of the present disclosure may be rechargeable, with a life cycle of at least 500 charge/discharge cycles, at least 1,000 charge/discharge cycles, at least 5,000 charge/discharge cycles, at least 10,000 charge/discharge cycles, at least 20,000 charge/discharge cycles, at least 30,000 charge/discharge cycles, between 500 and 50,000 charge/discharge cycles, between 1,000 and 50,000 charge/discharge cycles, between 5,000 and 50,000 charge discharge cycles, between 500 and 30,000 charge/discharge cycles, between 1,000 and 30,000 charge/discharge cycles, between 5,000 and 30,000 charge discharge cycles, between 500 and 20,000 charge/discharge cycles, between 1,000 and 20,000 charge/discharge cycles, or between 5,000 and 20,000 charge/discharge cycles.

By way of example, electrochemical cells of the present disclosure may be used in portable batteries including those in hand-held and/or wearable electronic devices, such as a phone, watch, or laptop computer; in stationary electronic devices, such as a desktop or mainframe computer; in an electric tool, such as a power drill; in an electric or hybrid land, water, or air-based vehicle, such as a boat, submarine, bus, train, truck, car, motorcycle, moped, powered bicycle, airplane, drone, other flying vehicle, or toy versions thereof; for other toys; for energy storage, such as in storing electric power from wind, solar, wave, hydropower, or nuclear energy and/or in grid storage, or as a stationary power store for small-scale use, such as for a home, business, or hospital.

Supercapacitor cells may also contain electrochemical cells of the present disclosure and may be used in particular, in applications requiring quick discharge and/or high power, such as electric tools and electric or hybrid vehicles.

EXAMPLES

The following examples are provided to further illustrate the principles and specific aspects of the disclosure. They are not intended to and should not be interpreted to encompass the entire breath of all aspects of the disclosure. Features of the following examples may independently be combined with any features of electrochemical cells of the disclosure described more generally above.

Example 1—Electrochemical Cells

A number of comparative electrochemical cells with a Li$^+$ liquid electrolyte and some with a solid glass electrolyte according to the present disclosure were prepared and tested. Results are presented in FIG. 5, FIG. 6, and FIG. 7.

The cathode active material in the cells was the F-doped Ni/Mn spinel Li[Li$_x$Mn$_{1.5-y}$Ni$_{0.5-z}$]O$_{4-x-\delta}$F$_x$ with x=y+z≈0.36. Carbon was also present in the cathode. The cathode current collector was Al metal. The anode was Li metal. The solid glass electrolyte contained a Li$^+$ electrolyte mobile cation (a Li$^+$-glass) and had the general formula Li$_{3-2x}$Ba$_x$Cl$_{1-2y}$O$_y$. The solid glass electrolyte was in a non-woven cellulose paper matrix. The liquid electrolyte was 1M LiPF$_6$ in a mixture of ethylene carbonate (EC) and diethyl carbonate (DEC) in a 1:1 by v/v ratio. The polymer/plasticizer, if present, was succinonitrile mixed with LiClO$_4$ at a molar ratio of 20:1.

One type of cell, referred to as the Li$^+$-glass cell, contained Li$^+$-glass and the polymer/plasticizer. One comparative type of cell, referred to as the liquid electrolyte-polymer/plasticizer cell, contained the liquid electrolyte and a polymer/plasticizer. Another comparative type of cell, referred to as the liquid electrolyte cell, contained the liquid electrolyte without a polymer/plasticizer.

Example 2—Use of Electrochemical Cells to Light LEDs

A the Li$^+$-glass cell was used to light red and white light-emitting diodes (LEDs). A discharge electronic current $0.1 \leq I_{dis} \leq 1$ mA at a discharge voltage $V_{dis} > 3.0$ V was observed.

Example 3—Nyquist Plots

Figure 5:
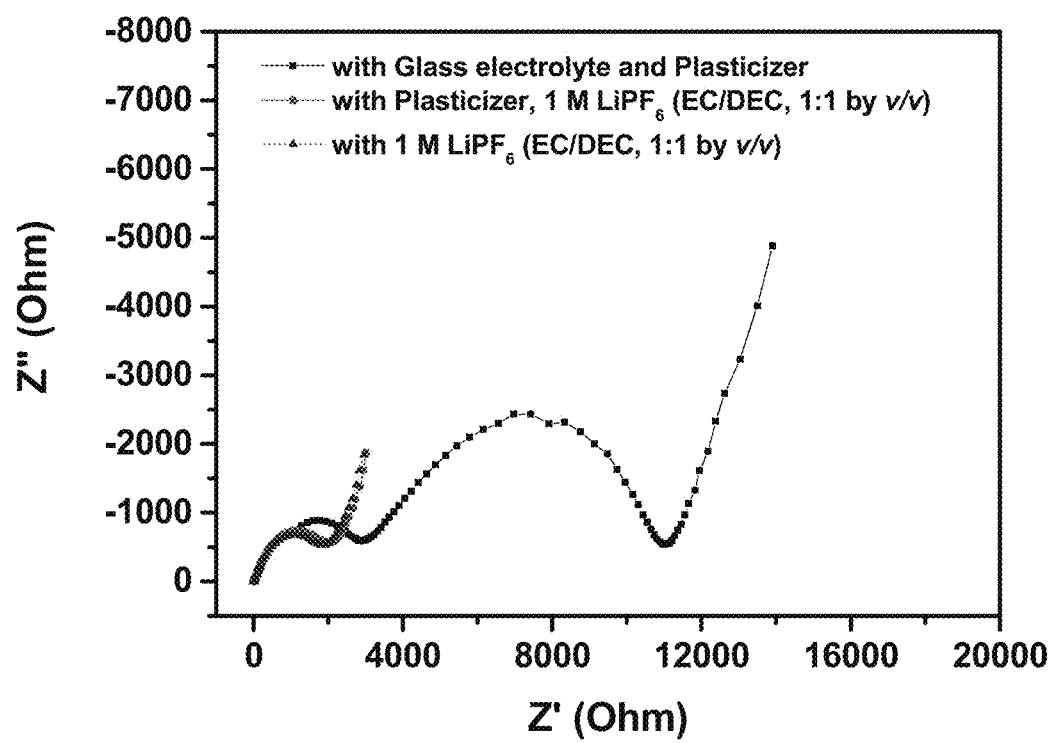
FIG. 5 is a graph presenting the combined Nyquist plots of three electrochemical cells. One electrochemical cell contained a solid glass electrolyte and a polymer/plasticizer according to the present disclosure (labeled "with Glass electrolyte and Plasticizer"). One electrochemical cell contained a liquid electrolyte and a polymer/plasticizer (labeled "with Plasticizer, 1 M $LiPF_6$ (EC/DEC 1:1 by v/v). The remaining electrochemical cell contained a liquid electrolyte and no polymer/plasticizer (labeled "with 1M $LiPF_6$ (EC/DEC, 1:1 by v/v).

FIG. 5 is a Nyquist plot of the ac Li$^+$ ion conductivity at room temperature (20° C.-25° C.) of the three types of electrochemical cells tested. Squares present data from an aged the Lit glass cell. Closed circles present data from an as-assembled liquid electrolyte-polymer/plasticizer cell. The triangles present data from an as-assembled liquid electrolyte cell.

The small semicircles seen at the left side of the graph at high frequency were similar for all three electrochemical cells, which shows the bulk Li$^+$ ion conductivities in the liquid electrolyte and the Li$^+$-glass are similar, but the resistivity in the polymer/plasticizer was very large at room temperature and detection was impaired in the liquid electrolyte-polymer/plasticizer cell because the polymer/plasticizer formed a quasi-blocking electrode with the cathode.

The large semicircle seen at the center of the graph at a larger real impedance (Z') in the electrochemical cell with the Li$^+$-glass electrolyte and polymer/Li$^+$-glass cell ion conductivity of the Li$^+$ ion in the Li$^+$-glass electrolyte close to the electric double layer capacitors at the Li$^+$-glass electrolyte:anode interface and the Li$^+$-glass electrolyte:polymer/plasticizer interface.

Example 4—Voltages and Capacities with Various Electrolytes

FIG. 6 presents comparative data obtained using the liquid electrolyte-polymer/plasticizer cells or the liquid electrolyte cells. FIG. 7 presents data obtained using the Li$^+$-glass cells.

Figure 6A:
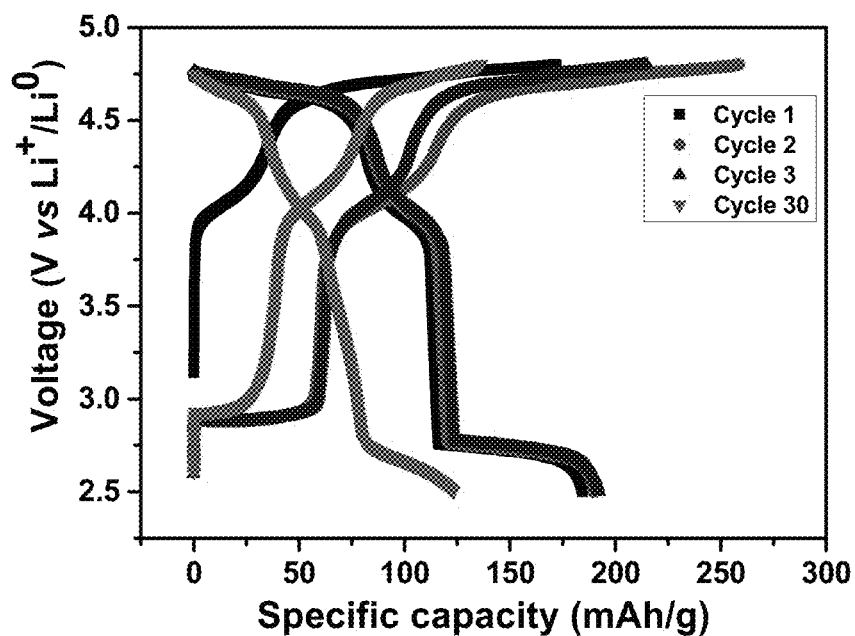
FIG. 6A is a graph of charge/discharge voltages as a function of the electrochemical cell capacity for the indicated number of cycles in an electrochemical cell with a liquid electrolyte and no polymer/plasticizer.
Figure 6B:
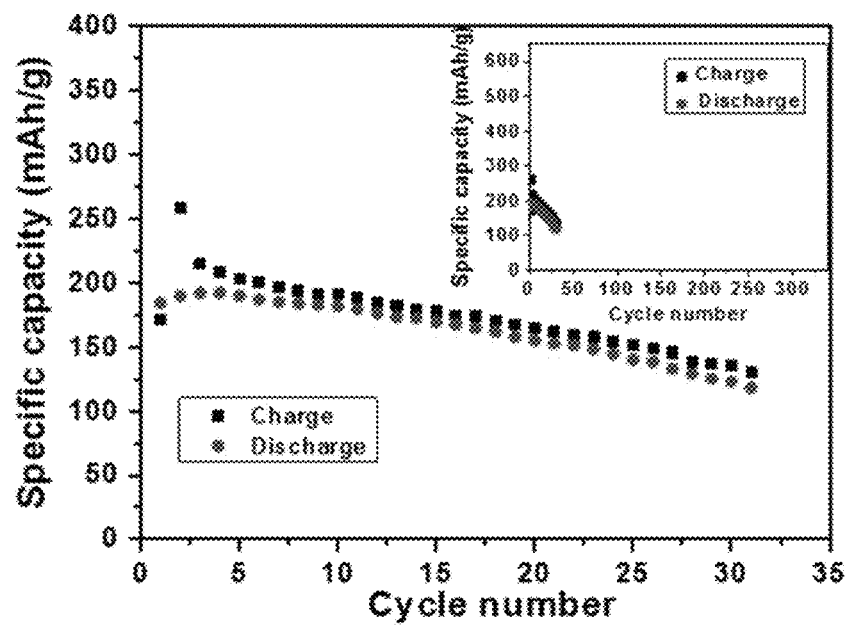
FIG. 6B is a graph of charge and discharge capacity as a function of cycle number in the electrochemical cell a liquid electrolyte and no polymer/plasticizer.

FIG. 6A and FIG. 6B present data from a liquid electrolyte cell. The cell an initial discharge voltage at about 4.7 V, but the capacity faded rapidly on cycling because of oxidation on charge of the liquid electrolyte.

Figure 6C:
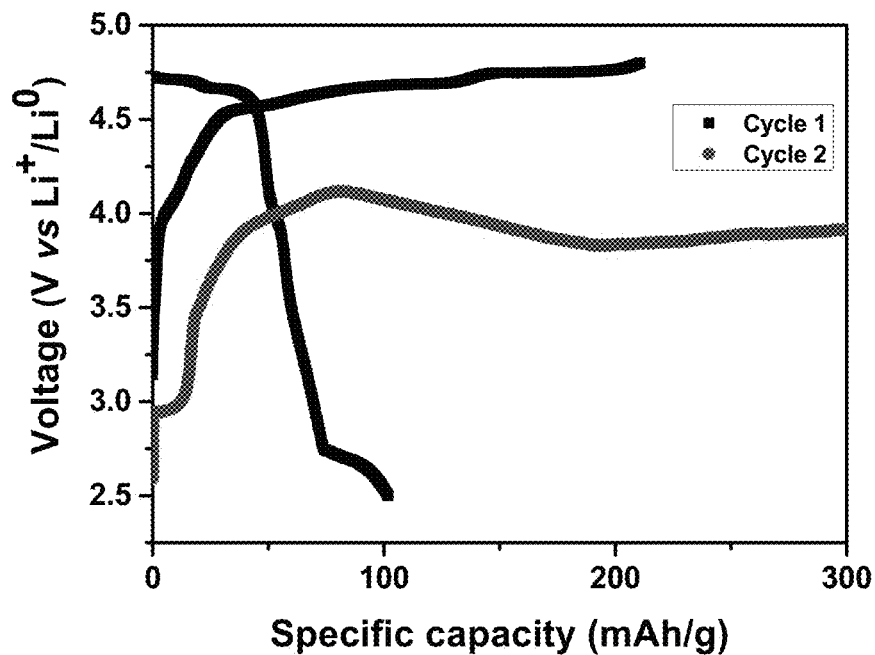
FIG. 6C is a graph of charge/discharge voltages as a function of the electrochemical cell capacity for the indicated number of cycles in an electrochemical cell with liquid electrolyte and polymer/plasticizer.

FIG. 6C presents data from the liquid electrolyte-polymer/plasticizer cell. The cell showed a rapid reduction of the charging voltage and no discharge current by the second cycle, indicating metallic lithium was not plated on the anode from the mobile cations in the liquid electrolyte.

Figure 7A:
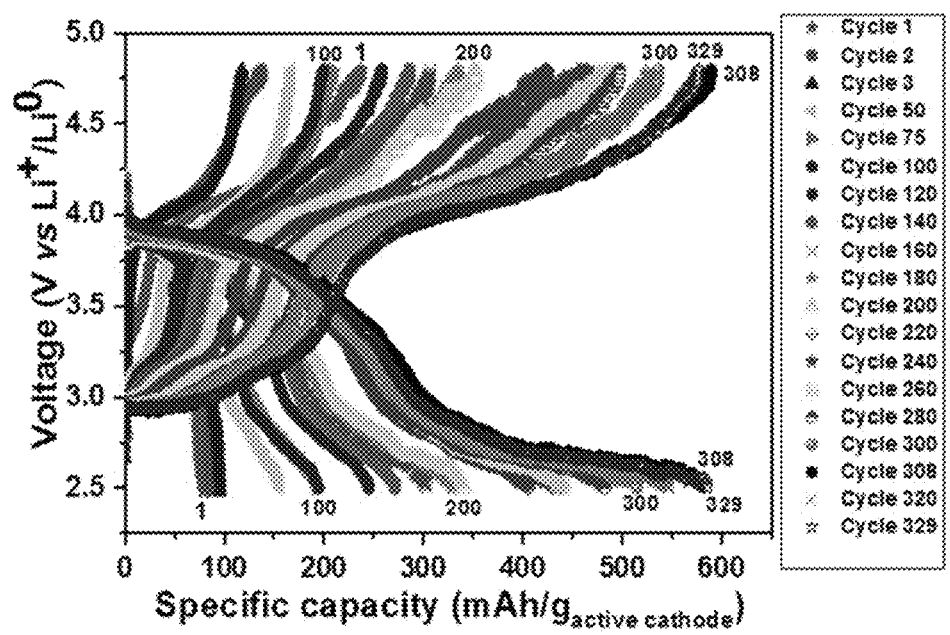
FIG. 7A is a graph of charge/discharge voltages as a function of the electrochemical cell capacity for the indicated number of cycles in an electrochemical cell with a solid glass electrolyte and polymer/plasticizer.
Figure 7B:
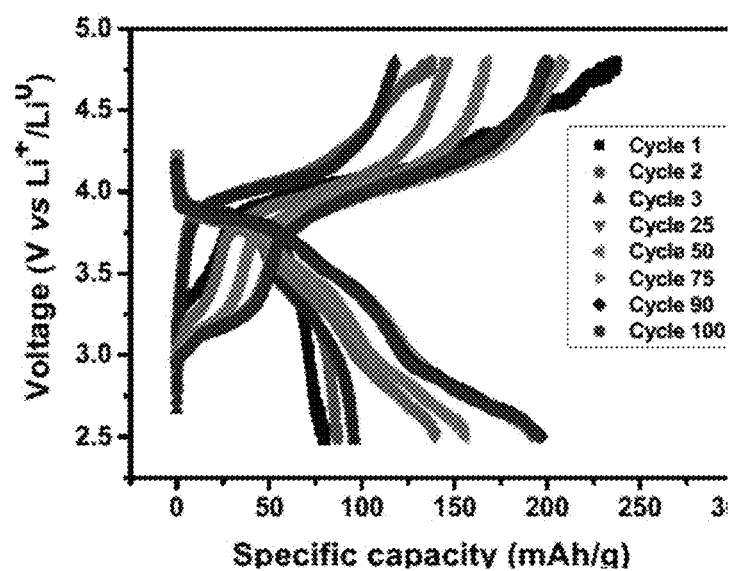
FIG. 7B is another graph of charge/discharge voltages as a function of the electrochemical cell capacity for the indicated number of cycles in an electrochemical cell with a solid glass electrolyte and polymer/plasticizer.
Figure 7C:
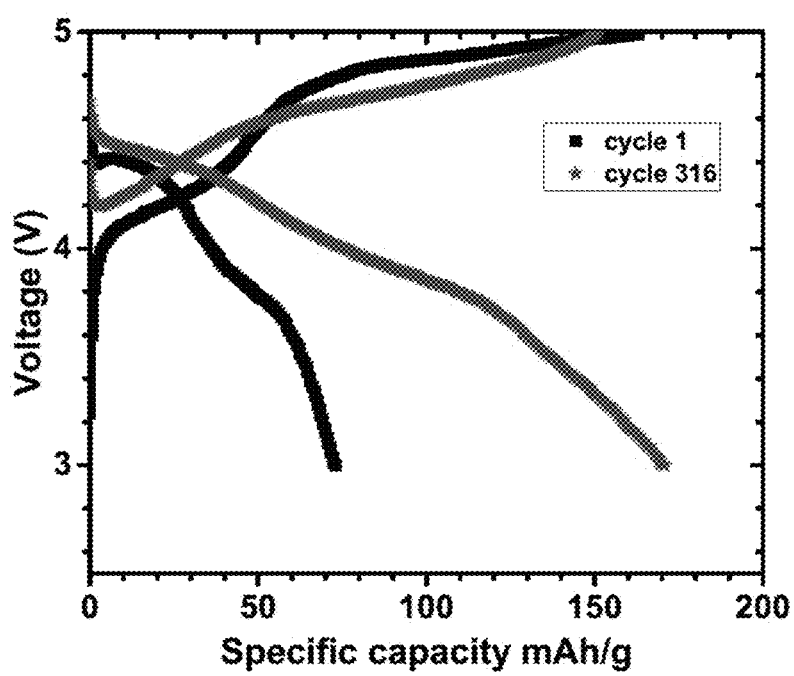
FIG. 7C is a graph of charge/discharge voltages as a function of the electrochemical cell capacity for the first cycle and the $316^{th}$ cycle in an electrochemical cell with a solid glass electrolyte and polymer/plasticizer.
Figure 7D:
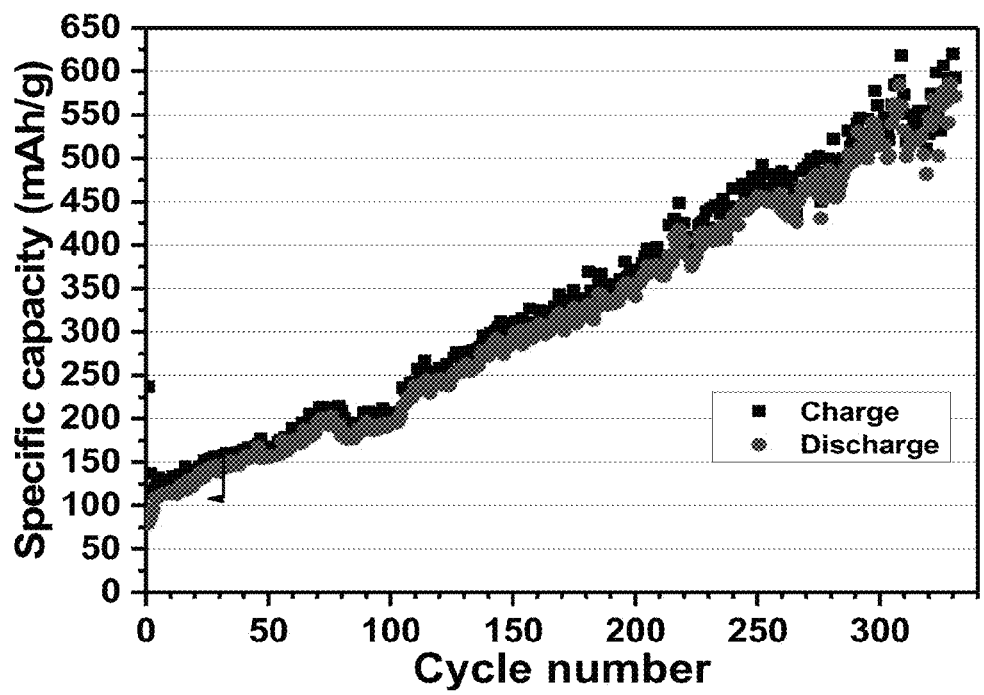
FIG. 7D is a graph of charge and discharge capacity as a function of cycle number in the electrochemical cell with a solid glass electrolyte and polymer/plasticizer.
Figure 7E:
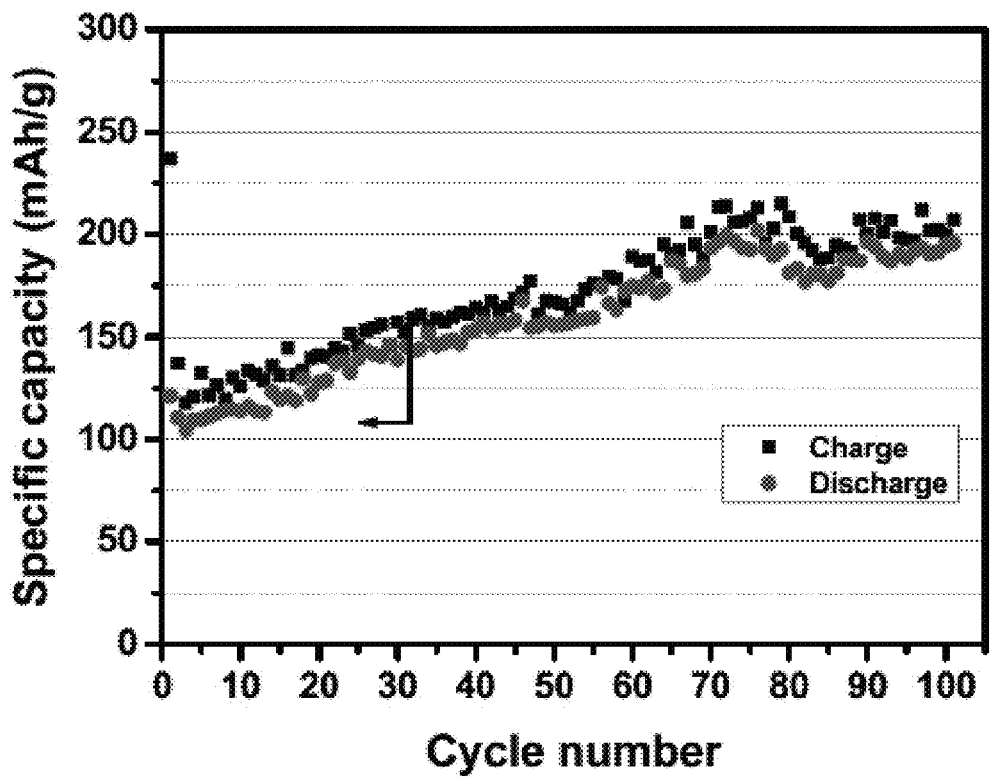
FIG. 7E is a graph of charge and discharge capacity as a function of cycle number in the electrochemical cell with a solid glass electrolyte and polymer/plasticizer.

In contrast, FIG. 7A, FIG. 7B, and FIG. 7C show that in the Li$^+$-glass cell discharge voltage remained stable over at least 300 cycles. FIG. 7D shows that the specific capacity (per g of cathode active material) actually increased with cycling, up to at least 300 cycles. This is the opposite of what is normally seen in electrochemical cells (see, e.g., FIG. 6B). In particular, the Li$^+$-glass cell exhibited with an increase of its capacity between 2.5 and 4.8 V from 75 mAh/g cathode active material to 585 mAh/g cathode active material (FIG. 7D). FIG. 7E presents data obtained with a different Li$^+$-glass cell, showing consistency in performance across cells.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

The invention claimed is:

1. A rechargeable electrochemical cell comprising:
   an electrolyte side comprising:
      a solid glass electrolyte comprising an electrolyte mobile cation and electric dipoles; and
      an anode comprising a metal of the electrolyte mobile cation and contacting the solid glass electrolyte at an anode:solid glass electrolyte interface;
   a cathode side comprising a cathode comprising a cathode active material into which a cathode guest cation is reversibly extracted/inserted, the cathode active material having a voltage versus lithium (Li) metal of between 3V and 15V; and
   a polymer/plasticizer contacting the solid glass electrolyte at a solid glass electrolyte:polymer/plasticizer interface and the cathode at a polymer/plasticizer:cathode interface such that the cathode guest cation is confined to the cathode side and the electrolyte mobile cation is confined to the anode side during charge and discharge of the electrochemical cell.

2. The rechargeable electrochemical cell of claim 1, wherein the electrolyte mobile cation and the cathode guest cation are the same type of cation.

3. The rechargeable electrochemical cell of claim 1, wherein the electrolyte mobile cation and the cathode guest cation are different types of cations.

4. The rechargeable electrochemical cell of claim 1, wherein the polymer/plasticizer comprises a mobile cation.

5. The rechargeable electrochemical cell of claim 4, wherein the mobile cation in the polymer/plasticizer is the same type of cation as the electrolyte mobile cation, the cathode guest cation, or both.

6. The rechargeable electrochemical cell of claim 4, wherein the mobile cation in the polymer/plasticizer is a different type of cation than the electrolyte mobile cation, the cathode guest cation, or both.

7. The rechargeable electrochemical cell of claim 1, wherein the polymer/plasticizer comprises a material having a dielectric constant between 50 and 24,000.

8. The rechargeable electrochemical cell of claim 4, wherein the polymer/polymer plasticizer comprises a polymer or plasticizer and the molar ratio of polymer or plasticizer to mobile cation is between 10:1 and 50:1.

9. The rechargeable electrochemical cell of claim 4, wherein the mobile cation is supplied by LiClO$_4$ in the polymer/plasticizer.

10. The rechargeable electrochemical cell of claim 1, wherein the polymer/plasticizer comprises a —C≡N terminal group.

11. The rechargeable electrochemical cell of claim 10, wherein the polymer/plasticizer comprises succinonitrile.

12. The rechargeable electrochemical cell of claim 1, wherein the polymer/plasticizer comprises electric dipoles.

13. The rechargeable electrochemical cell of claim 1, further comprising a cathode current collector contacting the cathode at a cathode:cathode current collector interface.

14. The rechargeable electrochemical cell of claim 1, wherein the electrolyte mobile cation, the cathode guest cation, or both moves in the direction of the anode or the cathode current collector on average no more than $\frac{1}{10,000}^{th}$ of the distance between the anode:sold glass electrolyte interface and the cathode:cathode current collector interface during a charge/discharge cycle of the electrochemical cell.

15. The rechargeable electrochemical cell of claim 1, wherein the metal in the anode comprises Li metal, sodium (Na) metal, potassium (K) metal, aluminum metal (Al), magnesium (Mg) metal, or alloys thereof.

16. The rechargeable electrochemical cell of claim 1, wherein the electrolyte mobile cation comprises lithium ion (Li$^+$), sodium ion (Na$^+$), potassium ion (K$^+$), aluminum ion (Al$^{3+}$), or magnesium ion (Mg$^{2+}$).

17. The rechargeable electrochemical cell of claim 1, wherein the cathode active material comprises a layered oxide, a spinel, or an olivine.

18. The rechargeable electrochemical cell of claim 1, wherein the cathode guest cation comprises lithium ion ($Li^+$), sodium ion ($Na^+$), potassium ion ($K^+$), aluminum ion ($Al^{3+}$), or magnesium ion ($Mg^{2+}$).

19. The rechargeable electrochemical cell of claim 1, wherein the cathode further comprises elemental carbon (C).

20. The rechargeable electrochemical cell of claim 1, wherein the electric dipoles of the solid glass electrolyte comprise material of the general formulas $A_2X$ or $AX^-$, or $MgX$ or $Al_2X_3$ where A is Li, Na, or K and X is oxygen (O), sulfur (S) or combinations thereof.

* * * * *